Nov. 12, 1963 J. T. POTTER ETAL 3,110,431

TAPE LOOP HANDLER WITH AIR SUPPORT

Filed Oct. 27, 1960 3 Sheets-Sheet 1

INVENTOR.
JOHN T. POTTER
GEORGE E. COMSTOCK 3D
BY EMIL SEKYRA
Alfred W. Barber
ATTORNEY

TAPE LOOP HANDLER WITH AIR SUPPORT

Filed Oct. 27, 1960 3 Sheets-Sheet 2

INVENTOR.
JOHN T. POTTER
GEORGE E. COMSTOCK 3D
BY EMIL SEKYRA
Alfred W. Barber
ATTORNEY

TAPE LOOP HANDLER WITH AIR SUPPORT

JOHN T. POTTER INVENTOR.
GEORGE E. COMSTOCK 3D
EMIL SEKYRA
BY
Alfred W. Barber
ATTORNEY 3,110,431
Patented Nov. 12, 1963

3,110,431

TAPE LOOP HANDLER WITH AIR SUPPORT

John T. Potter, Locust Valley, George E. Comstock 3d, Huntington, and Emil Sekyra, Rye, N.Y., assignors to Potter Instrument Company, Inc., Plainview, N.Y., a corporation of New York Filed Oct. 27, 1960, Ser. No. 65,372
5 Claims. (Cl. 226—95)

The present invention concerns magnetic tape handlers and, in particular, a tape handler for loops of magnetic tape.

Magnetic tape is widely used in the field of electronic computers for a number of purposes. Many of these uses come under the broad designation of memory devices. A memory device is one which will accept and hold information for varying periods of time or until removed. Information held in a memory must be accessible to meet various requirements. One of these requirements is that any piece or block of information held in a memory must be accessible in the shortest possible time. Some devices for storing information and making it available at any time and quickly are called random access memories. In a random access memory employing magnetic tape as the storage medium it may be required that the tape be kept in motion at high speed for extended periods of time. This in turn means that the tape will be required to make an extremely large number of passes. The present invention concerns a tape loop recording/playback device suitable for use as a random access memory device or the like in which high speed is possible and a substantial reduction in tape wear is provided over prior art devices. The characteristics of the device of the present invention are provided by reducing friction throughout the tape path to the vanishing point. This is accomplished, briefly, by using air to support and drive the tape. In this way wear is eliminated since the tape is driven and guided in such a way as to run over a film of air.

Accordingly one object of the present invention is to provide methods of and means for handling a tape loop in such a way as to substantially eliminate friction from its path of travel.

Another object is to provide a tape loop handler with a substantially friction-free tape path and capable of very high speed operation.

Still another object is to utilize air to guide magnetic tape and the like.

These and other objects will be apparent to those skilled in the art and within the spirit and scope of the invention as set forth in particular in the appended claims.

Figure 1:
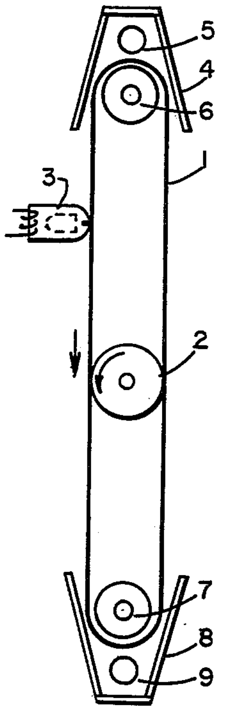
FIG. 1 shows a diagrammatic representation of one form of the present invention.

In FIG. 1 is shown a diagrammatic representation in which tape loop 1 passes over air drive capstan 2 through vacuum chambers 8 and 4 and across record/playback head 3. Air is drawn from vacuum chambers 8 and 4 through ports 9 and 5 respectively. Guide hubs 6 and 7 are provided to hold the tape during the threading operation and do not function during passage of the tape around its path of travel. These hubs may be large enough so that the tape clears them by a mere 1/16 to 1/8 inch so that when the machine is stopped the tape is held in essentially its running position and preventing it from being pulled out of symmetry upon restarting. Drive capstan 2 is perforated (see FIGS. 3 and 5) and a vacuum is drawn inside it so that the atmosphere presses the tape against its surface and thereby transmits driving force to the tape. The vacuum created by sucking air out through vents 5 and 9 causes atmospheric pressure to push the ends of the tape loop into the vacuum chambers and actually operate as a kind of end bearing. The vents on the sides of chambers 4 and 8 (see FIGS. 3 and 4) permit air to enter along the surface of the tape and prevent it from touching the sides of the chambers. This air flow between the walls of the vacuum chamber and the tape acts as a substantially friction-free bearing. The air also flows around the edges of the tape forming additional bearings and preventing the edges of the tape from contact with the front and back walls of the vacuum chambers. (In FIGS. 1 and 2 the front walls of the vacuum chambers are shown removed to more clearly show the internal parts and operation.) The tape path passes across the surface of record/playback head 3 at which point information may be recorded on or played back from the tape loop surface. The head shape and the tape surface speed is such that a film of air is drawn across the face of the record/playback head and again provides a substantially friction free bearing.

Figure 2:
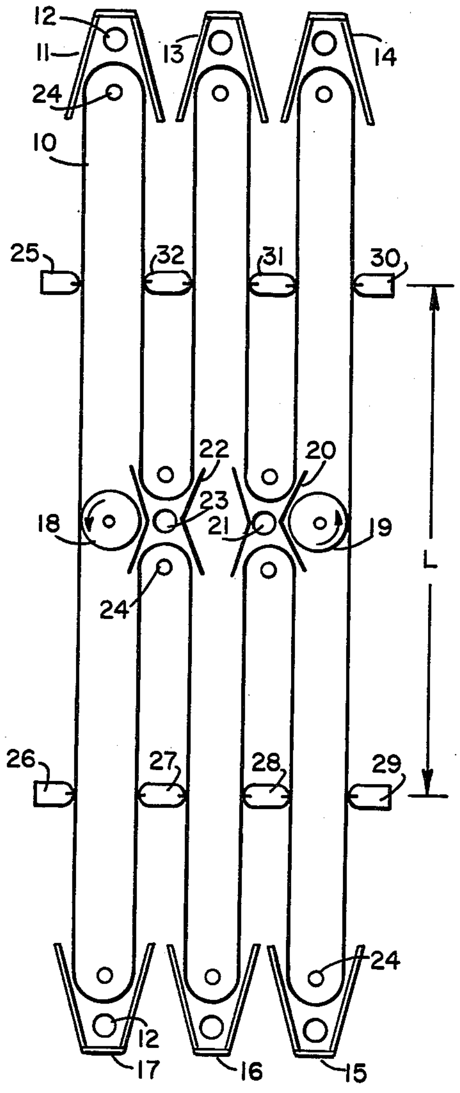
FIG. 2 shows a diagrammatic representation of another form of the present invention.

FIG. 2 shows a tape loop device in which a large number of intermediate loops are formed and a large number of record/playback heads are utilized with a relatively long tape loop of high capacity and still providing very short access time. Tape loop 10 passes through vacuum chambers 11, 13, 14, 15, 16, 17, 20 and 22 provided with vents 12, 21 and 23 for pulling a vacuum and supporting the intermediate folds or loops of the continuous tape. Threading pins 24 are provided. Two driving capstans 18 and 19 are provided at points substantially dividing the loop into two equal parts. A large number of record/playback heads 25, 26, 27, 28, 29, 30, 31 and 32 are provided at substantially equidistant points along the tape loop all separated from the adjacent heads by a distance substantially equal to L. In this way a tape loop of almost any reasonable length may be utilized as when a very large amount of information is to be stored in the memory and a very short access time is provided since the tape need be moved for only a distance less than L in either direction for any particular bit of information to encounter a record/playback head.

Figure 3:
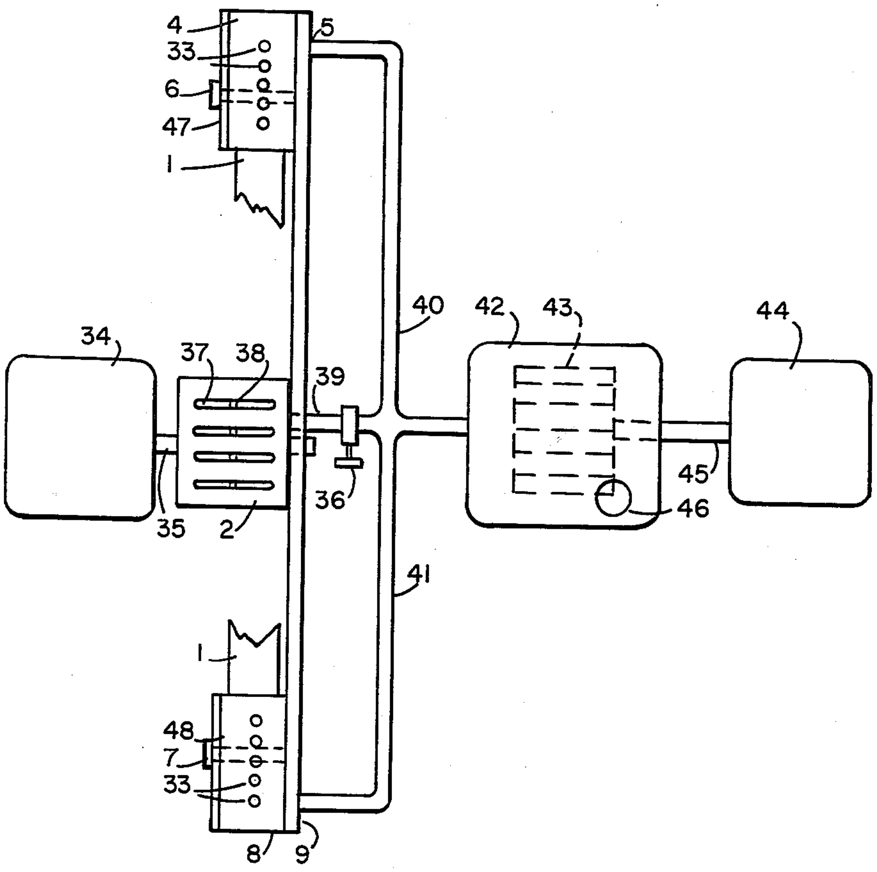
FIG. 3 shows a side view of the form shown in FIG. 1.

FIG. 3 shows a side view of the form of the invention shown in FIG. 1 in order to more clearly show certain details. This view shows vacuum chambers 4 and 8 provided with vents 33 to allow air to enter against the surface of tape 1. Front covers 47 and 48 of the vacuum chambers are shown. The vacuum may be provided by suitable means such as blower 42—43—46 driven by motor 44 through shaft 45 and pulling a vacuum through vents 5 and 9 over the connecting tubes 40 and 41. The vacuum is drawn inside the capstan 2 over tube 39 and is controlled by a suitable means such as valve 36. Capstan 2 is driven by motor 34 over drive shaft 35 and is provided with openings 38 to connect grooves 37 with the vacuum chamber inside said capstan.

Figure 4:
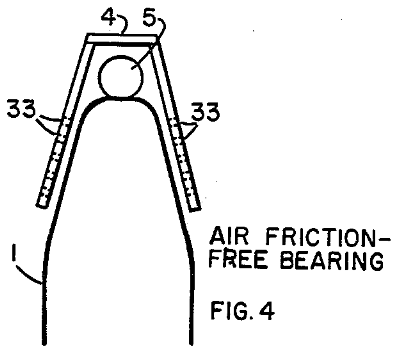
FIG. 4 shows a detail of the air guiding means utilized in the present invention.

FIG. 4 shows some additional details of vacuum chamber 4 in being a front view and enlarged to bring out the nature and location of vents 33 and the operating position of film 1 with respect to the walls of the chamber.

Figure 5:
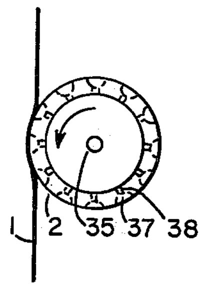
FIG. 5 shows a detail of the driving capstan.

FIG. 5 shows an enlarged end view of capstan 2 to bring out the relationship of vents 38 and grooves 37 to tape 1 when the tape is being driven by said capstan.

Figure 6:
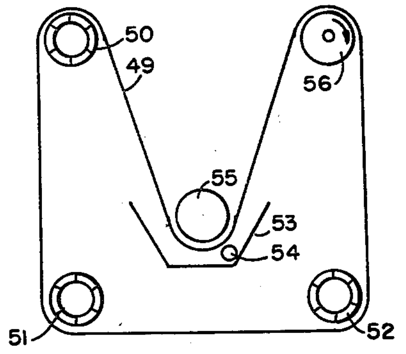
FIGS. 6, 7, 8 and 9 show further modified forms of the present invention.

FIG. 6 shows a modified form of air supported tape handling system in which the tape may be moved along an endless path without permitting the coated side of the tape to touch any guiding or driving devices except those provided with an air film. The tape is moved or pulled by a vacuum capstan 56 similar to the capstan 2 of FIGURE 5 and passes over three air cushion guide posts 50, 51 and 52 similar to the guide post 71 of FIGURE 10 and through one vacuum chamber 53 vented at 54 and around but not touching post 55. The coating is preferably on the side of the tape which is away from posts 50, 51 and 52. The vacuum chamber 53 is of the type shown in FIG. 4 in which the air bled through holes 33 forms an air film between the tape and the solid surfaces of the chamber.

Figure 7:
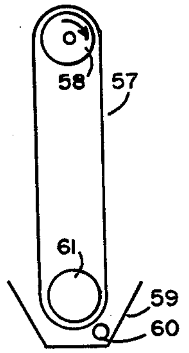

FIG. 7 shows a simple loop 57 passing over a driving vacuum capstan 58 and held in tension by vacuum in chamber 59 having post 60 and post 61.

Figure 8:
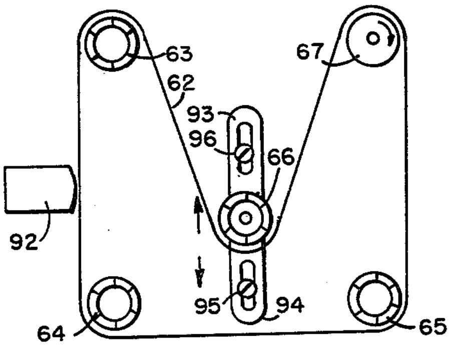

FIG. 8 shows a long path device with tape 62 pulled by capstan 67 over air film posts 63, 64, 65 and 66 and coupled to record/playback head 92. An adjustment of tape tension is provided by the movable mounting of post 66 wherein brackets 93 and 94 may be adjusted and then locked by screws 96 and 95.

Figure 9:
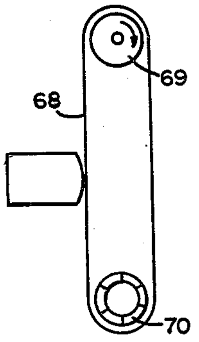

FIG. 9 shows a loop 68 passing over vacuum drive capstan 69 and around air film post 70. In this case the coated side of the film is turned away from all driving and guiding devices thereby reducing wear on the coating.

Figure 10:
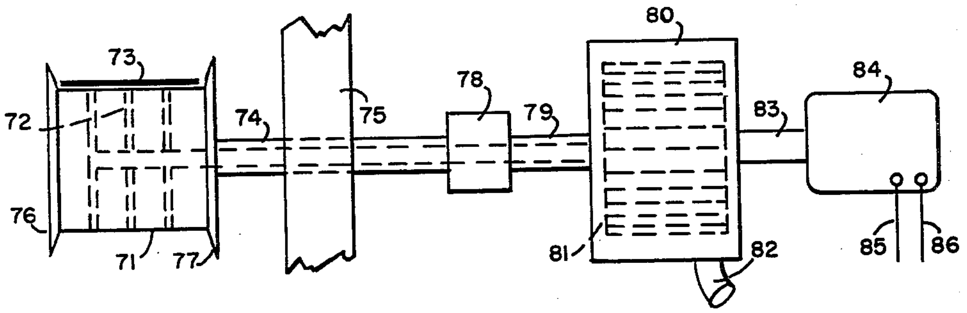

FIG. 10 shows details of an air film guide post 71 having end flanges 76 and 77 for guiding tape 73. The air film is provided by suitable means such as blower 80 in which fan 81 draws in air through pipe 82 and passes it out under pressure through pipes 79 and 74 and out through vents 72 in post 71. Blower 80 turned by shaft 83 driven by motor 84 receiving power over leads 85—86. Post 71 may be supported on a plate 75 and the blower output pipe 79 coupled to the post input pipe 74 by coupling 78. Air thus forced out between post 71 and tape 73 provides a substantially friction free air cushion or air film between the tape and the post protecting the tape from wear and scratching and reducing drag on the tape.

Figure 11:
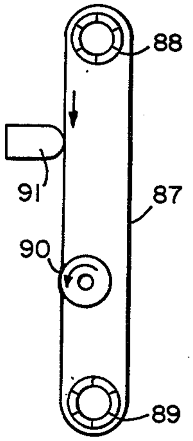
FIGS. 10 and 11 show details of portions of forms of the driving and guiding system useful in the present invention.

FIG. 11 shows a tape loop 87 inside of which are air film guide posts 88 and 89 and vacuum drive capstan 90. This inside surface of the tape loop when made the uncoated side of the tape is the only surface coming in proximity to the guide posts and the capstan driving means. The record/playback head 91 is placed outside the tape loop so that it can be coupled to the outside or coated side of the tape loop. Thus the tape loop is supported and driven solely from its uncoated side or surface.

In order to read the claim clearer, the following terms are defined: The bleed holes are the holes 33 which admit air from the outside under atmospheric pressure when the inside of the chamber has been partly evacuated. This air flowing through the bleed holes forms an air film between the tape and the angled walls of the vacuum chamber reducing friction to the vanishing point and keeping the tape from touching the chamber walls. Convolutions of the tape are the loops which form in the endless film as it passes in and out of several opposed vacuum chambers. The suction capstan is the capstan shown having means for drawing air out of it to create a partial vacuum which causes atmospheric pressure to press the tape against the capstan providing the required drag to drive the tape. Astride the tape path means across the tape path at a position which provides working contact between the tape and the record/playback head. The suction ports are the openings leading from the vacuum chambers to the pipes leading to the blower and are the points where air is drawn from the chambers to create vacuum within the chambers. By vacuum is meant partial vacuum since only enough difference in pressure need be provided to accomplish the purposes of supporting and driving the tape.

Thus, the present invention as above described has shown various means for handling a loop of magnetic tape with a minimum of contact with the coated surface, by means of various combinations of vacuum chambers and air film guide posts. The use of a vacuum drive capstan provides a system in which the entire handling process depends on the use of air. Many modifications will be apparent to those skilled in the art and within the spirit and scope of the invention as set forth in particular in the appended claims.

What is claimed is:

1. In a tape handling system, the combination of, a first vacuum chamber including a main suction port and a pair of angled side walls forming a tape-receiving opening, said side walls having bleed holes for supporting a loop of tape against an air film, a second vacuum chamber similar to said first chamber and positioned at a distance with its tape receiving opening facing the tape receiving opening of said first chamber for supporting an endless tape therebetween, each vacuum chamber having means for connection to a vacuum source, and a drive capstan mounted between said chambers for moving said tape along a path passing within both of said chambers.

2. In a tape handling system, the combination of, a first vacuum chamber including a main suction port for connection with a vacuum source and a pair of angled side walls forming a tape-receiving opening and having bleed holes for supporting a loop of tape against an air film, a second vacuum chamber similar to said first chamber and positioned at a distance with its tape-receiving side facing the tape-receiving side of said first chamber for supporting an endless tape therebetween, a suction capstan mounted between said chambers for moving said tape along a path passing within both of said chambers, and a record/playback head mounted astride said path for reproducing digital information.

3. In a tape handling system for moving an endless tape on which information is processed, the combination of, a first vacuum chamber having an opening to receive a first loop of the endless tape, a second vacuum chamber having an opening to receive a second loop of the endless tape, said first and second vacuum chambers being positioned relative to each other and at a distance from each other for supporting the endless tape therebetween, a first guide post supported in said first vacuum chamber adjacent the opening therein to support the first loop of endless tape when no vacuum is present, a second guide post supported in said second vacuum chamber adjacent the opening therein to support the second loop of endless tape when no vacuum is present, connection means on said first and second vacuum chambers to connect a vacuum source, so that when a vacuum is applied to said first and second chambers said loops of endless tape are supported substantially solely without physical contact with either of said chambers and either of said guide posts, and driving means adjacent a predetermined portion of said endless tape to move said tape at a high speed for extended periods of time.

4. In a tape handling system as set forth in claim 1 including a plurality of first vacuum chambers, and a plurality of second vacuum chambers.

5. In a tape handling system as set forth in claim 4 including a plurality of record/playback heads mounted adjacent said path for reproducing digital information.

References Cited in the file of this patent

UNITED STATES PATENTS

| | | |
|---|---|---|
| 2,852,253 | Pouliart et al. | Sept. 16, 1958 |
| 2,883,475 | Ridler et al. | Apr. 21, 1959 |
| 2,908,495 | Andrews et al. | Oct. 13, 1959 |
| 2,952,010 | Demer et al. | Sept. 6, 1960 |
| 2,962,200 | Pouliart et al. | Nov. 29, 1960 |
| 3,024,957 | Pinto | Mar. 13, 1962 |

FOREIGN PATENTS

| | | |
|---|---|---|
| 1,163,105 | France | Apr. 21, 1958 |
| 677,882 | Germany | July 5, 1939 |
| 808,096 | Great Britain | Jan. 28, 1959 |